United States Patent
Lu et al.

(10) Patent No.: US 10,949,490 B2
(45) Date of Patent: Mar. 16, 2021

(54) METHOD AND APPARATUS FOR DISPLAYING WEBPAGE CONTENT

(71) Applicant: BEIJING XIAOMI MOBILE SOFTWARE CO., LTD., Beijing (CN)

(72) Inventors: Yizhan Lu, Beijing (CN); Qing Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/394,439

(22) Filed: Apr. 25, 2019

(65) Prior Publication Data

US 2019/0332640 A1  Oct. 31, 2019

(30) Foreign Application Priority Data

Apr. 28, 2018 (CN) .......................... 201810402340.5

(51) Int. Cl.
| | |
|---|---|
| *G06F 3/0481* | (2013.01) |
| *G06F 16/957* | (2019.01) |
| *G06F 9/54* | (2006.01) |
| *H04L 29/08* | (2006.01) |
| *G06F 40/14* | (2020.01) |

(52) U.S. Cl.
CPC ........ *G06F 16/9577* (2019.01); *G06F 3/0481* (2013.01); *G06F 9/54* (2013.01); *G06F 40/14* (2020.01); *H04L 67/04* (2013.01)

(58) Field of Classification Search
CPC .... G06F 16/9577; G06F 40/14; G06F 3/0481; G06F 9/54; G06F 16/9558; G06F 16/9566; H04L 67/04
See application file for complete search history.

(56) References Cited

U.S. PATENT DOCUMENTS

| | | | | |
|---|---|---|---|---|
| 2012/0010995 | A1* | 1/2012 | Skirpa | ................. G06F 16/9577 705/14.49 |
| 2014/0317482 | A1* | 10/2014 | Sun | ....................... G06F 40/134 715/205 |
| 2015/0127838 | A1 | 5/2015 | Li et al. | |

FOREIGN PATENT DOCUMENTS

CN 107222369 A 9/2017

OTHER PUBLICATIONS

Extended European Search Report dated Jul. 24, 2019 in European Patent Application No. 19171386.6, 9 pages.

(Continued)

*Primary Examiner* — Phuong H Nguyen
(74) *Attorney, Agent, or Firm* — Oblon, McClelland, Maier & Neustadt, L.L.P.

(57) ABSTRACT

The disclosure relates to a method for displaying webpage content. The method includes displaying a floating window including a first webpage; receiving a trigger signal corresponding to a target object in the first webpage; acquiring a target webpage address corresponding to the target object; determining a target application program corresponding to the target webpage address; calling the target application program corresponding to the target webpage address; and displaying webpage content corresponding to the target webpage address through the target application program.

14 Claims, 7 Drawing Sheets

(56) References Cited

OTHER PUBLICATIONS

Satran, M., et al, "Launch the Windows Maps app—Windows UWP applications | Microsoft Docs", Aug. 2, 2017 (Aug. 2, 2017), XP055606425, retrieved from the Internet: URL:https://docs.microsoft.com;en-gbjwindows;uwpjlaunch-resume;launch-maps-app [retrieved on Jul. 17, 2019]* Introduction: "Learn how to launch the Windows Maps app from your app" Section "Introducing URis": "URI schemes let you open apps by clicking hyperlinks", "Just as you can start a new email using mailto: or open a web browser using http:, you can open the Windows maps app using bingmaps:, ms-drive-to:, and ms-walk-to:", "For example, the following URI opens the Windows Maps app and displays a map centered over New York City"; Section "Launch a URI frm your app".

* cited by examiner

METHOD AND APPARATUS FOR DISPLAYING WEBPAGE CONTENT

CROSS-REFERENCE TO RELATED APPLICATIONS

This application is based upon and claims priority to Chinese Patent Application Serial No. 201810402340.5, filed on Apr. 28, 2018, the entire contents of which are incorporated herein by reference.

TECHNICAL FIELD

The present disclosure relates to the field of terminal technology, and more particularly to a method and an apparatus for displaying webpage content.

BACKGROUND

Floating window technology may be used in terminals such as mobile phones, tablet computer, and the like. In some scenarios, a terminal may display a webpage through a floating window.

Since the size of a floating window is limited and may be much smaller than the size of a terminal screen, it is inconvenient to browse or process on the webpage content when the webpage is displayed through a floating window.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying webpage content. The method includes displaying a floating window including a first webpage; receiving a trigger signal corresponding to a target object in the first webpage; acquiring a target webpage address corresponding to the target object; determining a target application program corresponding to the target webpage address; calling the target application program corresponding to the target webpage address; and displaying webpage content corresponding to the target webpage address through the target application program.

According to an aspect, when calling the target application program corresponding to the target webpage address, the method also includes sending a call request to the target application program, wherein the call request includes the target webpage address, wherein the target application program is configured to acquire a page jump mode corresponding to the target webpage address from a server corresponding to the target application program, and display a target page based on the page jump mode corresponding to the target webpage address, wherein the target page includes the webpage content corresponding to the target webpage address.

According to another aspect, when calling the target application program corresponding to the target webpage address, the method also includes sending a call request to the target application program, wherein the call request includes a page jump mode corresponding to the target webpage address, wherein the target application program is configured to display a target page based on the page jump mode corresponding to the target webpage address, wherein the target page includes the webpage content corresponding to the target webpage address.

According to yet another aspect, the method also includes acquiring the page jump mode corresponding to the target webpage address from a server corresponding to an operating system.

According to yet another aspect, when determining the target application program corresponding to the target webpage address, the method also includes extracting key information from the target webpage address, wherein the key information is associated with an identification of an application program configured to display the webpage content corresponding to the target webpage address; acquiring application program identification information corresponding to the key information from a first corresponding relation based on the key information, wherein the first corresponding relation includes corresponding relations between different key information and different application program identification information; and determining an application program identified by the application program identification information as the target application program.

According to yet another aspect, when acquiring the target webpage address corresponding to the target object, the method also includes parsing a webpage file of the first webpage to acquire a parse result; and acquiring the target webpage address corresponding to the target object based on the parse result.

According to yet another aspect, the method further includes calling a browser; and displaying the webpage content corresponding to the target webpage address through the browser when the target application program is not installed in a terminal.

According to yet another aspect, the method further includes receiving a full-screen display command corresponding to the first webpage; calling a first application program corresponding to the first webpage based on the full-screen display command; and displaying the webpage content of the first webpage through the first application program.

Aspects of the disclosure also provide an apparatus for displaying webpage content. The apparatus includes a processor and a memory storing instructions executable by the processor. The processor is configured to display a floating window including a first webpage; receive a trigger signal corresponding to a target object in the first webpage; acquire a target webpage address corresponding to the target object; determine a target application program corresponding to the target webpage address; call the target application program corresponding to the target webpage address; and display webpage content corresponding to the target webpage address through the target application program.

Aspects of the disclosure also provide a non-transitory computer-readable storage medium storing instructions that, when executed by one or more processors of a device, cause the device to display a floating window including a first webpage; receive a trigger signal corresponding to a target object in the first webpage; acquire a target webpage address corresponding to the target object; determine a target application program corresponding to the target webpage address; call the target application program corresponding to the target webpage address; and display webpage content corresponding to the target webpage address through the target application program.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

Figure 1:
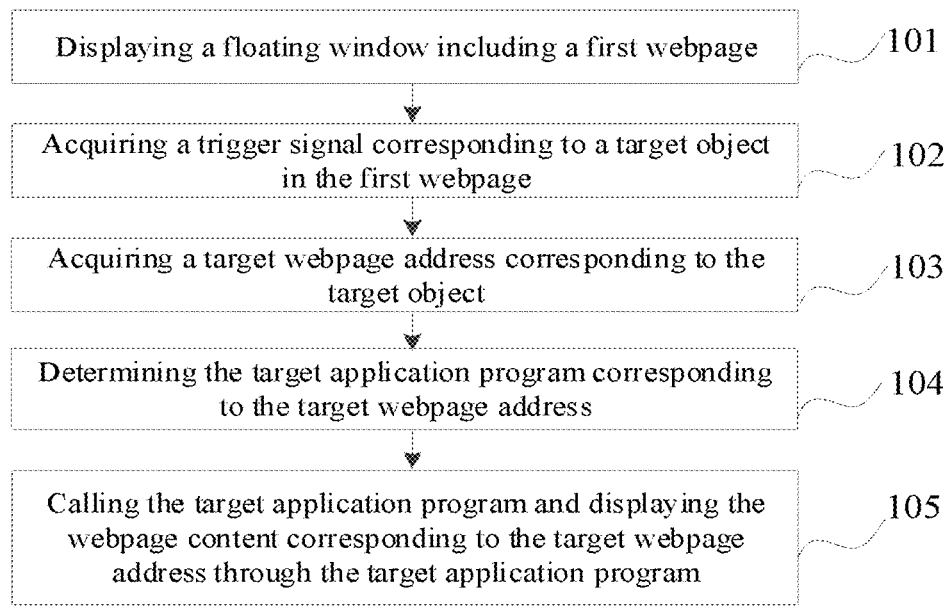
FIG. 1 is a flow chart showing a method for displaying webpage content according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with some aspects related to the disclosure as recited in the appended claims.

Methods and steps in the aspects of the present disclosure are executed by a terminal. For example, the terminal may be an electronic device, such as a mobile phone, a tablet computer, an electronic reader, a multimedia player, a personal computer (PC), a smart TV, etc. The terminal has the capability of parsing a webpage address and acquiring and displaying the webpage corresponding to the webpage address.

In a possible implementation, steps in the aspects of the present disclosure are executed by an operating system of a terminal. In the aspects of the present disclosure, the type of the operating system is not limited, and may be, for example, an Android operating system, an iOS operating system, a Windows operating system or a customized operating system based on an Android operating system, etc.

In another possible implementation, the steps in the aspects of the present disclosure are executed by an application program installed and run in a terminal. The application program may be an application program coming with the system, and may also be a third-party application program.

The method aspects are illustrated below by taking an example in which the steps are executed by an operating system. When the steps are executed by an application program, the application program may adopt the manner same to or similar to the one of the operating system to implement the solutions for displaying webpage content in the aspects of the present disclosure.

In the related art, the webpage is limitedly displayed in a floating window, which is inconvenient to browse and process on the webpage content.

In the technical solutions provided in the aspects of the present disclosure, when the trigger signal corresponding to the target object in a first webpage displayed in the floating window is acquired, the target webpage address corresponding to the target object is acquired and then the target application program corresponding to the target webpage address is called, to display the webpage content corresponding to the target webpage address through the target application program. Thus, the function of jump display of the webpage content between the floating window and the application program is realized, the webpage content is avoided to be limitedly displayed in the floating window and the convenience of browsing and operating on the webpage content is improved.

FIG. 1 is a flow chart showing a method for displaying webpage content according to an exemplary aspect of the present disclosure. In the present aspect, illustration is given by taking an example in which the steps are executed by an operating system. The method may include the following steps.

In step 101, a floating window including a first webpage is displayed.

The operating system displays a floating window which includes a first webpage. In some aspects, the floating window is displayed in the top layer of the screen. That is, the display level of the floating window is higher than the display levels of other user interfaces displayed on the screen. For example, the floating window is located in the upper layer of the first user interface, and the first user interface may be any user interface of a third-party application program and may also be a user interface showing other processes (such as a desktop process) of the operating system, which is not limited in the aspects of the present disclosure. The size of the floating window is smaller than the size of the terminal screen, so as to achieve the floating display effect. For example, the size of the floating window is half of the size of the terminal screen. The size of the floating window may be set in advance, which is not limited in the aspects of the present disclosure. In addition, the position of the floating window as displayed is not limited in the aspects of the present disclosure, either. For example, the floating window may be displayed at the middle part of the screen, at the middle-upper part of the screen, or at the middle-lower part of the screen, and the like.

Figure 2:
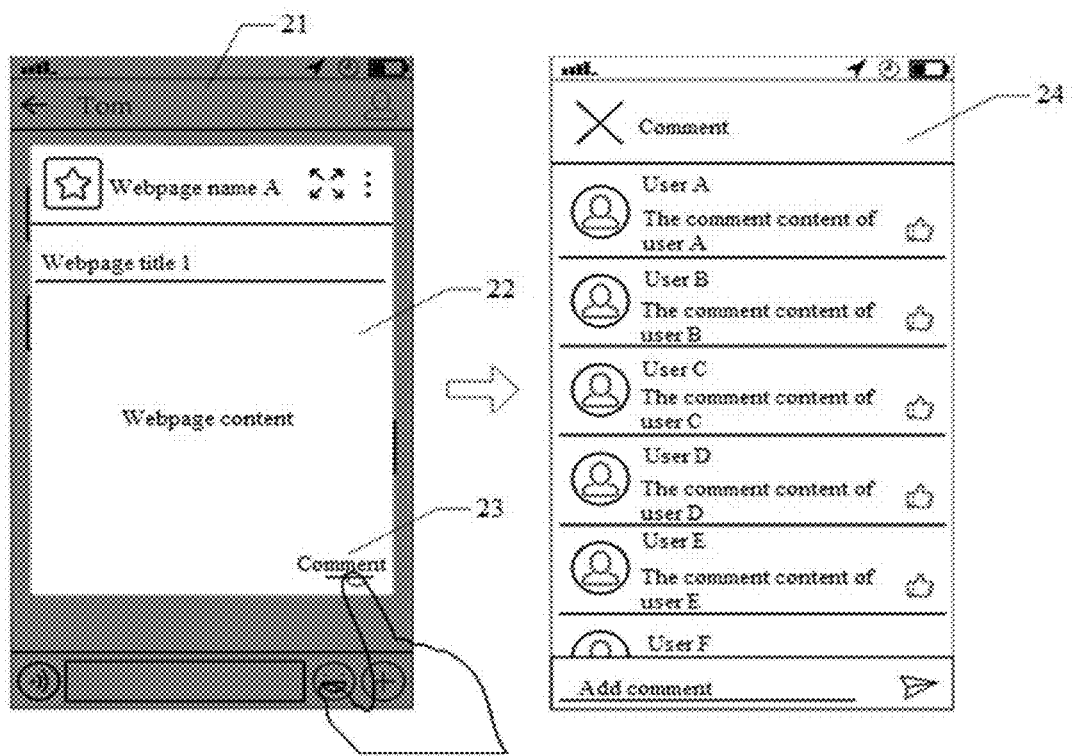
FIG. 2 is a schematic diagram of an interface according to an exemplary aspect of the present disclosure.

Referring to and combining FIG. 2, a floating window 22 is displayed in the upper layer of the user interface 21 of the terminal, and a webpage named A is displayed in the floating window 22.

In step 102, a trigger signal corresponding to a target object in the first webpage is acquired.

The first webpage includes webpage content, such as texts, pictures, links, etc. The target object may be any link in the first webpage, and the link could be triggered to open a webpage.

In the aspects of the present disclosure, the type of the trigger signal is not limited. By taking an example in which the terminal has a touch display screen, the user could trigger the trigger signal for the target object in the first webpage through the operations of clicking, pressing, checking, circling, etc. By taking an example in which the terminal does not have a touch display screen, the user could trigger the trigger signal for the target object by moving the cursor of the control device, such as the mouse, remote control, etc., to the position of the target object in the first webpage and performing operations of click, move, etc.

Referring to and combining FIG. 2, the user may click the "comment" link 23 in the webpage to trigger the display of the comment page.

In step 103, a target webpage address corresponding to the target object is acquired.

After acquiring the trigger signal corresponding to the target object, the operating system confirms that there is a demand for displaying a webpage at a sub level and acquires the target webpage address corresponding to the target object.

In some aspects, the operating system parses the webpage file of the first webpage and acquires the target webpage address corresponding to the target object according to the parse result. The webpage file of the first webpage has recorded the webpage content of the first webpage. For each link included in the first webpage, the webpage file of the first webpage has recorded the webpage address corresponding to each link. Therefore, the operating system could acquire the target webpage address corresponding to the target object by parsing the webpage file of the first webpage.

It should be noted that, in the aspects of the present disclosure, after acquiring the target webpage address, the operating system does not request to acquire the webpage file corresponding to the target webpage address from the internet, but instead executes following steps 104-105 and displays the webpage content through the target application program corresponding to the target webpage address.

In step 104, the target application program corresponding to the target webpage address is determined.

In the aspects of the present disclosure, a webpage address is a brief expression of the location and access method of a resource which is obtainable on the internet, and is the address of a standard resource on the internet. The webpage address includes modes (or referred to as protocol), server names (or Internet Protocol (IP) address), path and file name, and the above information is expressed by a character string composed of letters, numbers, symbols and other characters. In some aspects, the webpage address is a URL. As an example, the target webpage address is http://www.xxx.com/123456/654321.

In a possible implementation, the key information in the target webpage address is extracted, and then the application program identification information corresponding to the key information in the target webpage address is acquired based on the first corresponding relation. The application program identified by the application program identification information as acquired is determined as the target application program.

The key information in the target webpage address is associated with an identification of an application program used to display the webpage content corresponding to the target webpage address. In some aspects, the key information in the target webpage address includes the server name or IP address included in the target webpage address. Taking the target webpage address being http://www.xxx.com/123456/654321 as an example, xxx may be extracted to be the key information.

The first corresponding relation includes corresponding relations between different key information and different application program identification information. The first corresponding relation may be stored in the form of a table, which includes at least one item each including a corresponding relation between one group of key information and application program identification information. The first corresponding relation may be preset in the relevant storage device of the terminal by the publisher of the operating system. When the first corresponding relation is required, the operating system may read it from the above storage device. Certainly, the terminal may also request a background server corresponding to the operating system to update the first corresponding relation, so as to ensure the accuracy and timeliness of the first corresponding relation stored by the terminal.

Exemplarily, the above first corresponding relation is shown in table-1 below.

TABLE 1

| Key information | application program identification information |
|---|---|
| xxx | application program A |
| abc | application program B |
| aaa | application program C |
| . . . | . . . |

For example, the operating system, after extracting the key information xxx from the target webpage address, looks up the application program identification information corresponding to the key information xxx from the above first corresponding relation and finds application program A. Then, the application program A is determined as the target application program. Certainly, the first corresponding relation in the above table-1 is exemplary and illustrative only, which is not intended to limit the present disclosure.

Certainly, the above first corresponding relation may also be stored in the background server (which is referred to as "the second server" in the aspects of the present disclosure) corresponding to the operating system. The second server is used to provide background services for the operating system. The second server may be one server, and may also be a server cluster composed of a plurality of servers. For example, when the operating system is an operating system of xx phone manufacturer, the second server is the server whose operation and maintenance is handled by the xx phone manufacturer. When the operating system needs to determine the target application program corresponding to the target webpage address, the operating system may send the target webpage address to the second server. The second server extracts the key information in the target webpage address, looks up the application program identification information corresponding to the key information in the first webpage from the first corresponding relation, and then sends the application program identification information as found to the operating system. Correspondingly, the operating system receives the application program identification information sent by the second server, and determines the application program indicated by the application program identification information as the target application program. As such, by employing the second server to look up the application program identification information corresponding to the target webpage address, the background server resource could be fully used so as to reduce the processing overhead of the terminal.

In step 105, the target application program is called and the webpage content corresponding to the target webpage address is displayed through the target application program.

The operating system, after acquiring the target application program corresponding to the target webpage address, calls the target application program, to enable the target application program to run in the foreground, and displays the webpage content corresponding to the target webpage address through the target application program.

Referring to and combining FIG. 2, after the user clicks the "comment" link 23 in the webpage, the operating system acquires the webpage address corresponding to the "comment" link 23 (recorded as webpage address A), and determines the application program (recorded as application program A) corresponding to the webpage address A. Then, the operating system calls the application program A, and displays the webpage content corresponding the webpage address A, i.e., the comment page 24 shown in FIG. 2, through the application program A.

In a possible implementation, the operating system sends the first call request to the target application program. The first call request carries the target webpage address. The target application program is used to request to acquire the page jump mode corresponding to the target webpage address from the first server corresponding to the target application program after receiving the first call request, and display the target page according to the page jump mode corresponding to the target webpage address.

The first server is a background server of the target application program, and is used to provide background services for the target application program. The first server may be one server, and may also be a server cluster composed of a plurality of servers. The first server has a record of the corresponding relation between different webpage addresses and different webpage jump modes, which is referred to as the second corresponding relation in the aspects of the present disclosure. The second corresponding relation may be stored in the form of a table, which includes at least one item each including a corresponding relation between one group of webpage address and page jump mode. Exemplarily, the second corresponding relation is shown in table-2 below.

TABLE 2

| Webpage address | Page jump mode |
|---|---|
| webpage address A | mode 1 |
| webpage address B | mode 2 |
| webpage address C | mode 3 |
| ... | ... |

For example, after receiving the first call request, the target application program sends the jump request to the first server. The jump request includes the target webpage address, such as the webpage address A. After receiving the above jump request, the first server looks up the page jump mode corresponding to the target webpage address from the second corresponding relation, and sends the page jump mode as found to the target application program. For example, when the first server finds from the second corresponding relation that the page jump mode corresponding to the webpage address A is mode 1, the first server sends mode 1 to the target application program. After receiving the page jump mode corresponding to the target webpage address, the target application program displays the target webpage according to the above page jump mode, wherein the target webpage includes the webpage content corresponding to the target webpage address.

It should be noted that the browser and the target application program display the webpage content in different ways. By taking an example in which the webpage content corresponding to the target webpage address is displayed, the browser displays the webpage content corresponding to the target webpage address in the following way: the browser requests to acquire the webpage file corresponding to the target webpage address from the internet according to the target webpage address, parses the webpage file corresponding to the target webpage address to obtain the target webpage, and then renders and displays the target webpage. The target application program displays the webpage content corresponding to the target webpage address in the following way: the target application program acquires the page jump mode corresponding to the target webpage address, determines the target page to be displayed according to the page jump mode, and then displays the target page. Although both the target webpage and the target page include the webpage content corresponding to the target webpage address, there are some differences between the target webpage and the target page. The target webpage is a web page, while the target page is a user interface of an application program.

In addition, the page jump mode corresponding to the target webpage address is used to indicate the page information of the target page including the page content corresponding to the target webpage address, such that the target application program could accurately locate the target page to be displayed based on the page information of the target page, and then display the target page. In Android system, the communication between operating system and target application program may be realized based on intent, so as to call the target application program to display the target page.

In another possible implementation, the operating system sends a second call request to the target application program. The second call request carries the page jump mode corresponding to the target webpage address. The target application program is used to display the target page according to the page jump mode corresponding to the target webpage address after receiving the second call request.

In this implementation, the operating system acquires the page jump mode corresponding to the target webpage address, and sends it to the target application program directly through the second call request. As such, the target application program directly displays the target page according to the page jump mode carried by the second call request.

The operating system may acquire the page jump mode by the following way: requesting to acquire the page jump mode corresponding to the target webpage address from the second server corresponding to the operating system. As introduced above, the second server is a background server of the operating system, and stores the corresponding relation between webpage address and page jump mode related to the target application program. This corresponding relation is the same as the second corresponding relation as introduced above, which is not repeated here. In some aspects, if the corresponding relation between webpage address and page jump mode is maintained by the second server, the second server may maintain the corresponding relations between the webpage addresses and the page jump modes in relative to a plurality of different application programs, so as to provide the page jump function for a plurality of different application programs.

In some aspects, the second server stores the third corresponding relation, which includes the corresponding relation among the application program, the webpage address and the page jump mode. The third corresponding relation may also be stored in the form of a table. Exemplarily, the third corresponding relation is shown in table-3 below.

TABLE 3

| Application program | Webpage address | Page jump mode |
|---|---|---|
| application program A | webpage address A | mode 1 |
| | webpage address B | mode 2 |
| | webpage address C | mode 3 |
| | ... | ... |
| application program B | webpage address H | mode 11 |
| | webpage address I | mode 12 |
| | webpage address J | mode 13 |
| | ... | ... |
| ... | ... | ... |

In addition, no matter the corresponding relation between webpage address and page jump mode is maintained in the first server corresponding to the target application program maintains or the second server corresponding to the operating system, the servers could update the corresponding relation periodically to ensure the accuracy of the page jump.

In summary, in the solutions provided in the aspects of the present disclosure, when the trigger signal corresponding to the target object in the first webpage displayed in the floating window is acquired, the target webpage address corresponding to the target object is acquired and then the target application program corresponding to the target webpage address is called, to display the webpage content corresponding to the target webpage address through the target application program. Thus, the function of jump display of the webpage content between the floating window and the application program is realized, which avoids displaying the webpage content limitedly in the floating window and improves the convenience of browsing and operating on the webpage content.

In an alternative aspect provided based on the aspect shown in FIG. 1, if the target application program is not installed in the terminal, the operating system calls the browser, and displays the target webpage corresponding to the target webpage address through the browser. For example, the operating system sends the third call request which carries the target webpage address to the browser. The browser starts operation after receiving the third call request, acquires the webpage file corresponding to the target webpage address, parses the webpage file corresponding to the target webpage address to obtain the target webpage, and then renders and displays the target webpage. The above browser may be a browser coming with the operating system, and may also be a third-party browser installed in the terminal, which is not limited in the aspects of the present disclosure.

Through the above way, the function of jump display of the webpage content between floating window and browser is realized under the condition that the relevant application program is not installed in the terminal. Thus, this avoids displaying the webpage content limitedly in the floating window and improves the convenience of browsing and operating on the webpage content.

Figure 3:
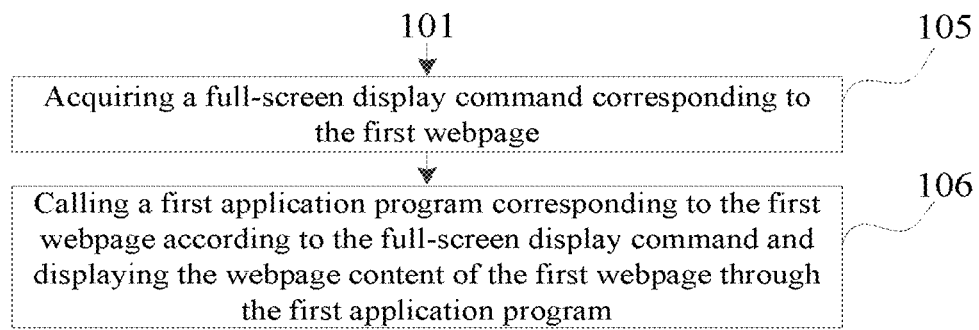
FIG. 3 is a flow chart showing a method for displaying webpage content according to another exemplary aspect of the present disclosure.

In another alternative aspect provided based on the aspect shown in FIG. 1, as shown in FIG. 3, the following steps may be included in subsequent to step 101.

In step 105, a full-screen display command corresponding to the first webpage is acquired.

When the first webpage is displayed in the floating window, if the user expects to read the webpage content of the first webpage in full screen, the user could trigger the full-screen display command corresponding to the first webpage.

In the aspects of the present disclosure, the method for triggering the full-screen display command is not limited. For example, the user may perform relevant operations in the floating window to trigger the full-screen display command, and may also trigger the full-screen display command via voice, gesture, emotion, etc., or shake the terminal, or press the physical buttons, etc., to trigger the full-screen display command, etc.

In a possible implementation, the floating window includes a full-screen display control which is an operating control used to trigger the full-screen display command. For example, the operating control may be a button. When the trigger signal corresponding to the full-screen display control in the floating window is acquired, the operating system acquires the full-screen display command corresponding to the first webpage.

Figure 4:
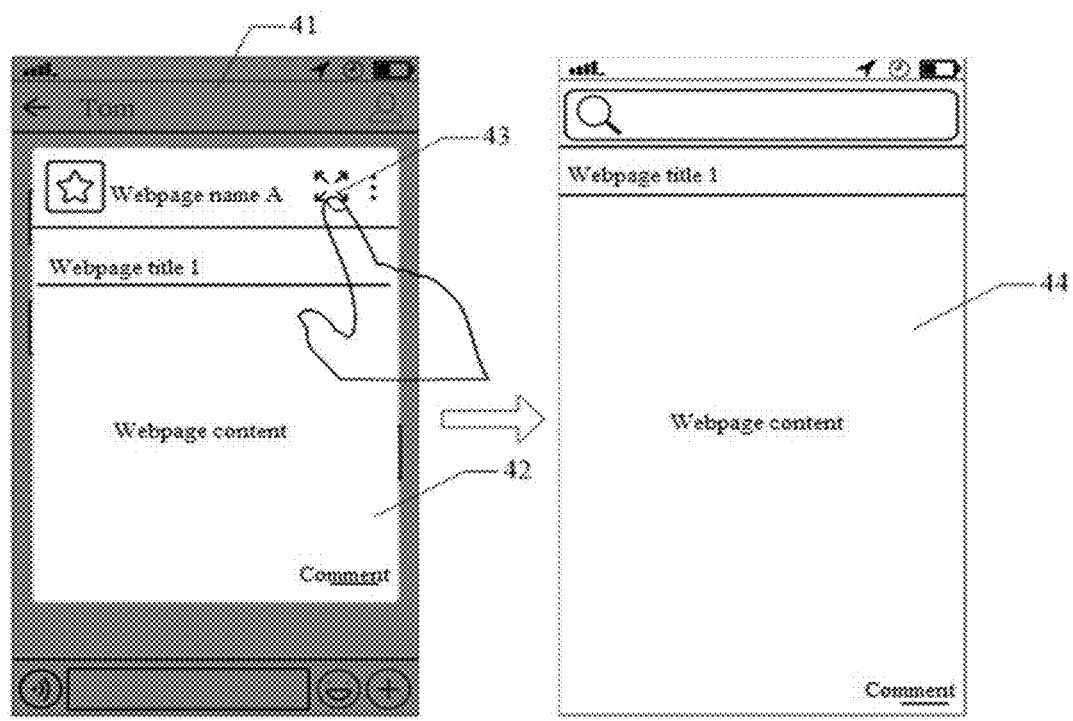
FIG. 4 is a schematic diagram of an interface according to another exemplary aspect of the present disclosure.

Referring to and combining FIG. 4, a floating window 42 is displayed in the upper layer of the user interface 41 of the terminal. The floating window 42 displays a webpage named A. When the user expects to browse the webpage content displayed in the floating window 42 in full screen, the user could click the full-screen display control 43 in the floating window 42.

In step 106, the first application program corresponding to the first webpage is called according to the full-screen display command, and the webpage content of the first webpage is displayed through the first application program.

In the aspects of the present disclosure, under the condition that the first application program corresponding to the first webpage is installed in the terminal, the operating system calls the first application program and displays the webpage content of the first webpage in full screen through the first application program.

In some aspects, the operating system acquires the first webpage address corresponding to the first webpage, extracts the key information in the first webpage address, acquires the application program identification information corresponding to the key information in the first webpage address based on the first corresponding relation introduced above, and determines the application program identified by the application program identification information as the first application program. The operating system may look up and determine the first application program in the terminal locally, and may also look up and determine the first application program through the background servers thereof, which is similar to the method for looking up and determining the target application program based on the first corresponding relation described above, and is not repeated here.

After determining the first application program corresponding to the first webpage, the operating system detects whether the first application program is installed in the terminal. If the first application program is installed in the terminal, the operating system calls the first application program such that the first application program runs in the foreground, and displays the webpage content corresponding to the first webpage address through the first application program, so as to achieve the aim of displaying the webpage content of the first webpage in full screen. The method of displaying the webpage content corresponding to the first webpage address by the first application program is the same as or similar to the method of displaying the webpage content corresponding to the target webpage address by the target application program as introduced above, and may refer to the introduction and description above, which is not repeated here.

Referring to and combining FIG. 4, after the user clicks the full-screen display control 43 in the floating window 42, the operating system calls the corresponding application program and displays the webpage content on the interface 44 of the application program by running the application program in the foreground.

In addition, if the first application program corresponding to the first webpage is not installed in the terminal, the operating system may call the browser to enable the browser to run in the foreground, and display the first webpage through the browser, which may also achieve the aim of displaying the webpage content of the first webpage in full screen.

In the solutions provided in the aspects of the present disclosure, when the full-screen display command corresponding to the first webpage is acquired, the first application program corresponding to the first webpage is called, and the first application program is run in the foreground and displays the webpage content of the first webpage. In this way, the aim of displaying the webpage content of the first webpage in full screen is achieved. Additionally, by displaying the webpage content of the first webpage in full screen through the first application program corresponding to the first webpage, display of the first webpage by adopting the first application program that matches up with the first webpage is realized, so as to achieve better display effect.

The apparatus aspects of the present disclosure are described as follow, which may be used to implement the method aspects of the present disclosure. For details which are not disclosed in the apparatus aspects of the present disclosure, reference may be made to the method aspects of the present disclosure.

Figure 5:
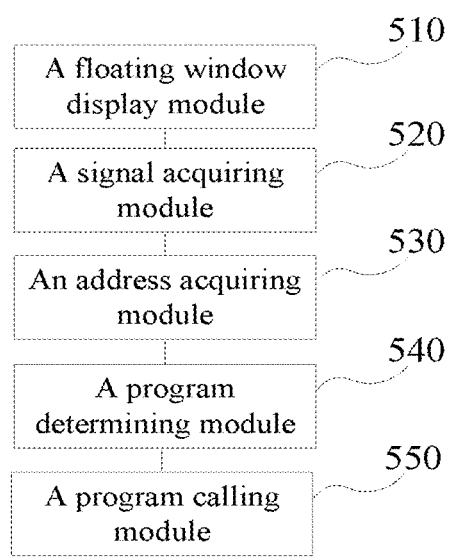
FIG. 5 is a block diagram illustrating an apparatus for displaying webpage content according to an exemplary aspect of the present disclosure.

FIG. 5 is a block diagram illustrating an apparatus for displaying webpage content according to an exemplary aspect of the present disclosure. The apparatus has the function of implementing the above method examples, which may be achieved by hardware or by corresponding software executed by hardware. The apparatus may include: a floating window display module 510, a signal acquiring module 520, an address acquiring module 530, a program determining module 540, and a program calling module 550.

The floating window display module 510 is configured to display a floating window including a first webpage.

The signal acquiring module 520 is configured to acquire a trigger signal corresponding to a target object in the first webpage.

The address acquiring module 530 is configured to acquire a target webpage address corresponding to the target object.

The program determining module 540 is configured to determine a target application program corresponding to the target webpage address.

The program calling module 550 is configured to call the target application program and display the webpage content corresponding to the target webpage address through the target application program.

In summary, in the solutions provided in the aspects of the present disclosure, when the trigger signal corresponding to the target object in the first webpage displayed in the floating window is acquired, the target webpage address corresponding to the target object is acquired and then the target application program corresponding to the target webpage address is called, to display the webpage content corresponding to the target webpage address through the target application program. Thus, the function of jump display of the webpage content between the floating window and the application program is realized, which avoids displaying the webpage content limitedly in the floating window and improves the convenience of browsing and operating on the webpage content.

In an alternative aspect provided based on the aspect shown in FIG. 5, the program calling module 550 is configured to send a first call request carrying the target webpage address to the target application program, wherein the target application program is used to request to acquire the page jump mode corresponding to the target webpage address from the first server corresponding to the target application program and display the target page according to the page jump mode corresponding to the target webpage address, and the target page includes the webpage content corresponding to the target webpage address.

In another alternative aspect provided based on the aspect shown in FIG. 5, the program calling module 550 is configured to send a second call request carrying the page jump mode corresponding to the target webpage address to the target application program, wherein the target application program is used to display the target page according to the page jump mode corresponding to the target webpage address, and the target page includes the webpage content corresponding to the target webpage address.

In some aspects, the apparatus further includes a mode acquiring module.

The mode acquiring module is configured to request to acquire the page jump mode corresponding to the target webpage address from the second server corresponding to the operating system.

In another alternative aspect provided based on the aspect shown in FIG. 5, the program determining module 540 is configured to: extract key information in the target webpage address which is associated with an identification of an application program used to display the webpage content corresponding to the target webpage address; and acquire application program identification information corresponding to the key information in the target webpage address from a first corresponding relation according to the key information, and determine the application program identified by the application program identification information as the target application program; wherein the first corresponding relation includes corresponding relations between different key information and different application program identification information.

In another alternative aspect provided based on the aspect shown in FIG. 5, the address acquiring module 530 is configured to parse the webpage file of the first webpage and acquire the target webpage address corresponding to the target object according to the parse result.

Figure 6:
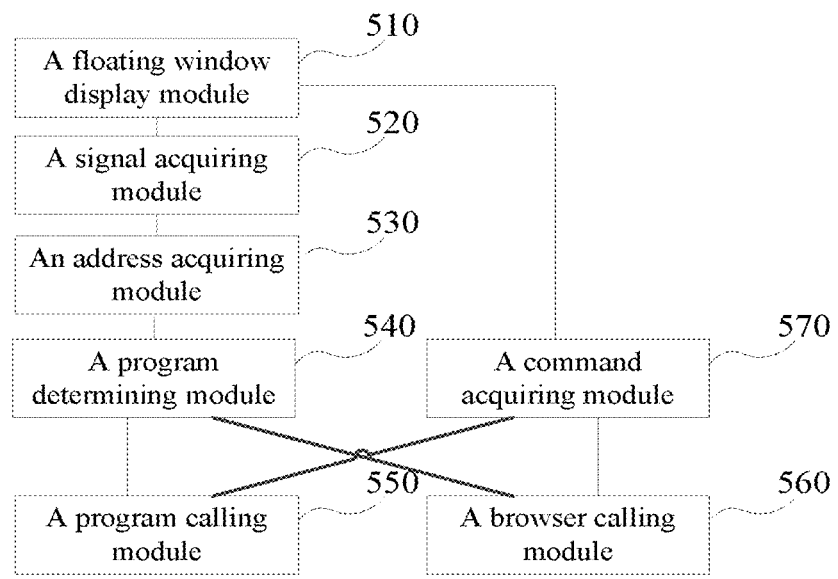
FIG. 6 is a block diagram illustrating an apparatus for displaying webpage content according to another exemplary aspect of the present disclosure.

In another alternative aspect provided based on the aspect shown in FIG. 5, as shown in FIG. 6, the apparatus further includes: a browser calling module 560.

The browser calling module 560 is configured to call a browser and display the webpage content corresponding to the target webpage address through the browser when the target application program is not installed in the terminal.

In another alternative aspect provided based on the aspect shown in FIG. 5, as shown in FIG. 6, the apparatus further includes a command acquiring module 570.

The command acquiring module 570 is configured to acquire a full-screen display command corresponding to the first webpage.

The program calling module 550 is further configured to call a first application program corresponding to the first webpage according to the full-screen display command, and display the webpage content of the first webpage through the first application program.

It should be noted that the above division of each of the functional modules is only exemplary. In practice, when the apparatus as provided in the above aspect is to realize it functions, the above-described functions may be assigned to and completed by different functional modules based on practical requirements, such that the internal structure of the apparatus could be divided into different functional modules to complete all or part of the functions described above.

With respect to the apparatus of the above aspect, the specific operation method performed by each module has been described in details in the method aspect, and would not be described in details herein.

There is further provided an apparatus for displaying webpage content according to an exemplary aspect of the present disclosure, which is capable of implementing the method for displaying webpage content provided in the present disclosure. The apparatus includes: a processor, and a memory storing instructions executable by the processor. The processor is configured to: display a floating window including a first webpage; acquire a trigger signal corresponding to a target object in the first webpage; acquire a target webpage address corresponding to the target object; determine a target application program corresponding to the target webpage address; and call the target application program and display the webpage content corresponding to the target webpage address through the target application program.

In some aspects, the processor is configured to: send a first call request carrying the target webpage address to the target application program, wherein the target application program is used to request to acquire a page jump mode corresponding to the target webpage address from a first server corresponding to the target application program and display a target page according to the page jump mode corresponding to the target webpage address, and the target page includes the webpage content corresponding to the target webpage address.

In some aspects, the processor is configured to: send a second call request to the target application program, the second call request carrying the page jump mode corresponding to the target webpage address, wherein the target application program is used to display a target page according to the page jump mode corresponding to the target webpage address, and the target page includes the webpage content corresponding to the target webpage address.

In some aspects, the processor is further configured to: request to acquire the page jump mode corresponding to the target webpage address from a second server corresponding to an operating system.

In some aspects, the processor is configured to: extract key information in the target webpage address, and the key information is associated with an identification of an application program used to display the webpage content corresponding to the target webpage address; and acquire application program identification information corresponding to the key information in the target webpage address from a first corresponding relation according to the key information, and determine an application program identified by the application program identification information as the target application program; wherein the first corresponding relation includes the corresponding relations between different key information and different application program identification information.

In some aspects, the processor is configured to: parse a webpage file of the first webpage and acquire the target webpage address corresponding to the target object according to the parse result.

In some aspects, the processor is further configured to: call a browser and display the webpage content corresponding to the target webpage address through the browser when the target application program is not installed in a terminal.

In some aspects, the processor is further configured to: acquire a full-screen display command corresponding to the first webpage; and call a first application program corresponding to the first webpage according to the full-screen display command and display the webpage content of the first webpage through the first application program.

Figure 7:
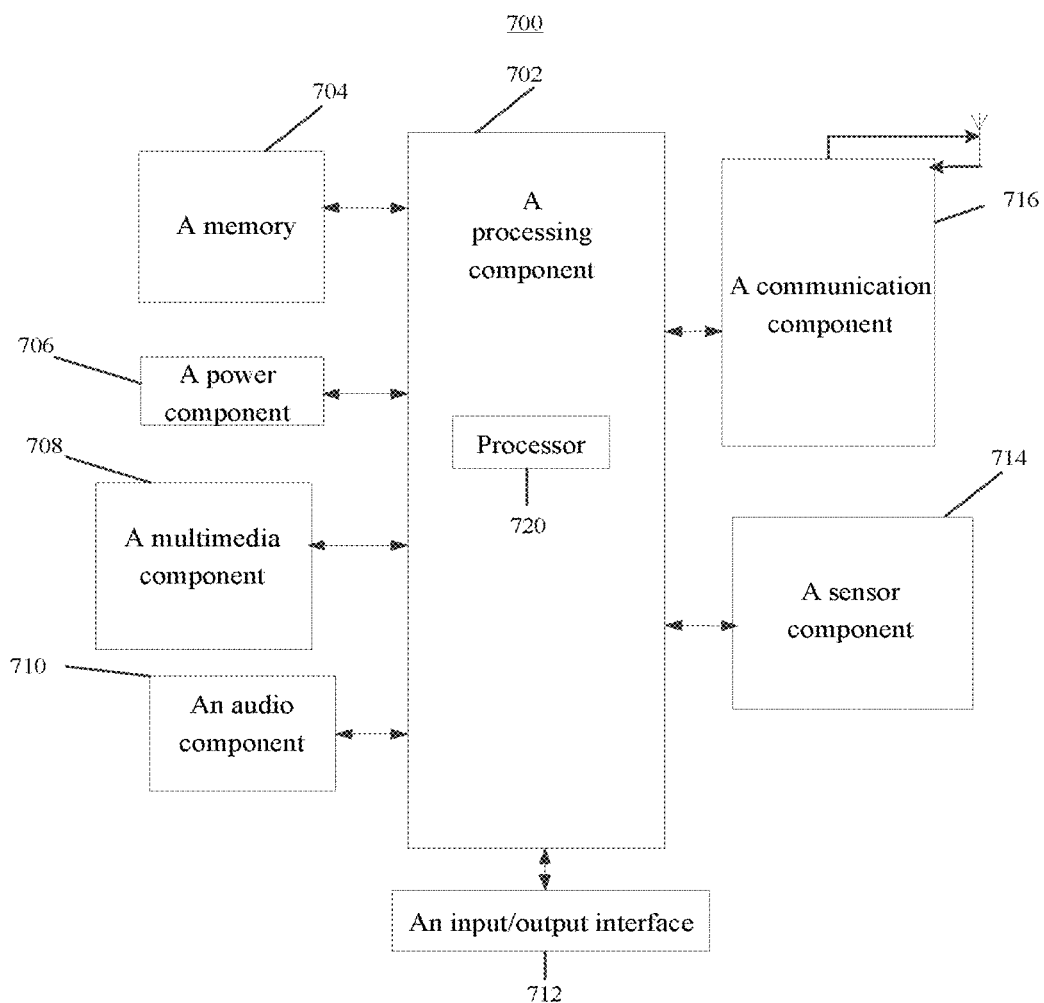
FIG. 7 is a block diagram of an apparatus according to an exemplary aspect of the present disclosure.

FIG. 7 is a block diagram of an apparatus 700 according to an exemplary aspect of the present disclosure. For example, the apparatus 700 may be a mobile phone, a computer, a digital broadcast terminal, a messaging device, a gaming console, a tablet device, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the apparatus 700, such as operations associated with display, telephone calls, data communications, camera operations, and recording operations. The processing component 702 may include one or more processors 720 to execute instructions to perform all or part of the steps of the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense the boundary of a touch or swipe action, but also sense the time period and pressure associated with a touch or swipe action. In some aspects, the multimedia component 708 includes a front camera and/or a rear camera. The front camera and/or the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some aspects, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide the status assessments of various aspects of the apparatus 700. For instance, the sensor component 714 may detect the open/closed status of the apparatus 700, and the relative positioning of components such as the display and the keypad of the apparatus 700. The sensor component 714 may also detect the change in position of the apparatus 700 or a component of the apparatus 700, the presence or absence of user contact with the apparatus 700, the orientation or acceleration/deceleration of the apparatus 700, and the change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some aspects, the sensor component 714 may also include an accelerometer sensor, a gyroscope sensor, a magnetic sensor, a pressure sensor, or a temperature sensor.

The communication component 716 is configured to facilitate the communication, in a wired or wireless manner, between the apparatus 700 and other devices. The apparatus 700 could access a wireless network based on a communication standard, such as WiFi, 2G, or 3G, or a combination thereof. In one exemplary aspect, the communication component 716 receives a broadcast signal or broadcast associated information from an external broadcast management system via a broadcast channel. In one exemplary aspect, the communication component 716 further includes a near field communication (NFC) module to facilitate short-range communications.

In exemplary aspects, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for displaying webpage content.

In exemplary aspects, there is further provided a non-transitory computer-readable storage medium including instructions such as memory 704 including instructions, wherein the instructions could be executed by the processor 720 in the apparatus 700 for performing the above-described methods. For example, the non-transitory computer-readable storage medium may be a ROM, a random access memory (RAM), a CD-ROM, a magnetic tape, a floppy disc, an optical data storage device, and the like.

There is provided a non-transitory computer-readable storage medium, wherein when the instructions (or computer programs) in the storage medium are executed by the processor of the apparatus 700, the apparatus 700 may perform the method for displaying webpage content in the above aspects.

It should be understood that the term "plurality" herein refers to two or more. "And/or" herein describes the correspondence of the corresponding objects, indicating three kinds of relationships. For example, A and/or B, could be expressed as: A exists alone, A and B exist concurrently, B exists alone. The character "/" generally indicates that the context objects are in an "or" relationship.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the disclosure disclosed here. This application is intended to encompass any variations, uses, or adaptations of the disclosure following the general principles thereof and including common knowledge or conventional technical means as come within known or customary practice in the art which is not disclosed in the present disclosure. It is intended that the specification and examples are considered as exemplary only, with a true scope and spirit of the present disclosure being indicated by the following claims.

It will be appreciated that the present disclosure is not limited to the exact constructions which have been described above and illustrated in the accompanying drawings, and various modifications and changes could be made without departing from the scope thereof. It is intended that the scope of the present disclosure is only limited by the appended claims.

What is claimed is:

1. A method for displaying webpage content, comprising:
displaying a floating window including a first webpage;
receiving a trigger signal corresponding to a target object in the first webpage;
acquiring a target webpage address corresponding to the target object;
determining a target application program corresponding to the target webpage address;
calling the target application program corresponding to the target webpage address; and
displaying webpage content corresponding to the target webpage address through the target application program;
wherein, after displaying the floating window including the first webpage, the method further comprises:
receiving a full-screen display command corresponding to the first webpage;

calling a first application program corresponding to the first webpage based on the full-screen display command; and displaying the webpage content of the first webpage through the first application program, wherein determining the target application program corresponding to the target webpage address comprises:

extracting key information from the target webpage address, wherein the key information is associated with an identification of an application program configured to display the webpage content corresponding to the target webpage address;

acquiring application program identification information corresponding to the key information from a first corresponding relation based on the key information, wherein the first corresponding relation includes corresponding relations between different key information and different application program identification information; and determining an application program identified by the application program identification information as the target application program.

2. The method according to claim 1, wherein calling the target application program corresponding to the target webpage address comprises:

sending a call request to the target application program, wherein the call request includes the target webpage address, wherein the target application program is configured to:

acquire a page jump mode corresponding to the target webpage address from a server corresponding to the target application program, and display a target page based on the page jump mode corresponding to the target webpage address, wherein the target page includes the webpage content corresponding to the target webpage address.

3. The method according to claim 1, wherein calling the target application program corresponding to the target webpage address comprises:

sending a call request to the target application program, wherein the call request includes a page jump mode corresponding to the target webpage address, wherein the target application program is configured to:

display a target page based on the page jump mode corresponding to the target webpage address, wherein the target page includes the webpage content corresponding to the target webpage address.

4. The method according to claim 3, further comprising:

acquiring the page jump mode corresponding to the target webpage address from a server corresponding to an operating system.

5. The method according to claim 1, wherein acquiring the target webpage address corresponding to the target object comprises:

parsing a webpage file of the first webpage to acquire a parse result; and acquiring the target webpage address corresponding to the target object based on the parse result.

6. The method according to claim 1, further comprising:

calling a browser; and displaying the webpage content corresponding to the target webpage address through the browser when the target application program is not installed in a terminal.

7. An apparatus for displaying webpage content, comprising:

a processor; and a memory storing instructions executable by the processor, wherein the processor is configured to:

display a floating window including a first webpage;

receive a trigger signal corresponding to a target object in the first webpage;

acquire a target webpage address corresponding to the target object;

determine a target application program corresponding to the target webpage address;

call the target application program corresponding to the target webpage address; and display webpage content corresponding to the target webpage address through the target application program;

wherein, after displaying the floating window including the first webpage, the processor is further configured to:

receive a full-screen display command corresponding to the first webpage;

call a first application program corresponding to the first webpage based on the full-screen display command; and display the webpage content of the first webpage through the first application program, wherein, when determining the target application program corresponding to the target webpage address, the processor is further configured to:

extract key information from the target webpage address, wherein the key information is associated with an identification of an application program configured to display the webpage content corresponding to the target webpage address; and acquire application program identification information corresponding to the key information from a first corresponding relation based on the key information, wherein the first corresponding relation includes corresponding relations between different key information and different application program identification information; and determine an application program identified by the application program identification information as the target application program.

8. The apparatus according to claim 7, wherein, when calling the target application program corresponding to the target webpage address, the processor is further configured to:

send a first call request to the target application program, wherein the call request includes the target webpage address, wherein the target application program is configured to:

acquire a page jump mode corresponding to the target webpage address from a server corresponding to the target application program, and display a target page based on the page jump mode corresponding to the target webpage address, wherein the target page includes the webpage content corresponding to the target webpage address.

9. The apparatus according to claim 7, wherein, when calling the target application program corresponding to the target webpage address, the processor is further configured to:

send a call request to the target application program, wherein the call request includes a page jump mode corresponding to the target webpage address, wherein the target application program is configured to:

display a target page based on the page jump mode corresponding to the target webpage address, and wherein the target page includes the webpage content corresponding to the target webpage address.

10. The apparatus according to claim 9, wherein the processor is further configured to:
acquire the page jump mode corresponding to the target webpage address from a server corresponding to an operating system.

11. The apparatus according to claim 7, wherein, when acquiring the target webpage address corresponding to the target object, the processor is further configured to:
parse a webpage file of the first webpage to acquire a parse result; and
acquire the target webpage address corresponding to the target object based on the parse result.

12. The apparatus according to claim 7, wherein the processor is further configured to:
call a browser; and
display the webpage content corresponding to the target webpage address through the browser when the target application program is not installed in a terminal.

13. A non-transitory computer-readable storage medium storing instructions that, when executed by one or more processors of a device, cause the device to:
display a floating window including a first webpage;
receive a trigger signal corresponding to a target object in the first webpage;
acquire a target webpage address corresponding to the target object;
determine a target application program corresponding to the target webpage address;
call the target application program corresponding to the target webpage address; and
display webpage content corresponding to the target webpage address through the target application program;
wherein, after displaying the floating window including the first webpage, the instructions further cause the device to:
receive a full-screen display command corresponding to the first webpage;
call a first application program corresponding to the first webpage based on the full-screen display command; and
display the webpage content of the first webpage through the first application program,
wherein, when determining the target application program corresponding to the target webpage address, the instructions further cause the device to:
extract key information from the target webpage address, wherein the key information is associated with an identification of an application program configured to display the webpage content corresponding to the target webpage address; and
acquire application program identification information corresponding to the key information from a first corresponding relation based on the key information, wherein the first corresponding relation includes corresponding relations between different key information and different application program identification information; and
determine an application program identified by the application program identification information as the target application program.

14. The non-transitory computer-readable storage medium according to claim 13, wherein the instructions further cause the device to:
call a browser; and
display the webpage content corresponding to the target webpage address through the browser when the target application program is not installed in a terminal.

* * * * *